US010421472B2

(12) United States Patent
Shubs et al.

(10) Patent No.: US 10,421,472 B2
(45) Date of Patent: Sep. 24, 2019

(54) VISUAL DIAGNOSTIC SYSTEM FOR RAILROAD NETWORK

(71) Applicant: Electro-Motive Diesel Inc., LaGrange, IL (US)

(72) Inventors: Alexander Shubs, Chicago, IL (US); James David Seaton, Westmont, IL (US); David Matthew Roenspies, Elburn, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 938 days.

(21) Appl. No.: 14/826,148

(22) Filed: Aug. 13, 2015

(65) Prior Publication Data
US 2017/0043799 A1 Feb. 16, 2017

(51) Int. Cl.
*B61L 27/00* (2006.01)
*G06Q 10/06* (2012.01)

(52) U.S. Cl.
CPC ....... *B61L 27/0077* (2013.01); *B61L 27/0094* (2013.01); *G06Q 10/063* (2013.01)

(58) Field of Classification Search
CPC ............ B61L 27/0077; B61L 27/0094; G06Q 10/063
USPC .......................................................... 701/19
See application file for complete search history.

(56) References Cited

U.S. PATENT DOCUMENTS

| 7,233,844 B2 * | 6/2007 | Peltz .......................... B60T 7/18 701/19 |
| 7,783,507 B2 | 8/2010 | Schick et al. |
| 8,082,076 B2 | 12/2011 | Sells et al. |
| 8,231,270 B2 | 7/2012 | Groeneweg et al. |
| 2009/0005928 A1 * | 1/2009 | Sells .................. G06Q 30/0641 701/31.7 |
| 2013/0261842 A1 * | 10/2013 | Cooper ............... B61L 15/0081 701/1 |
| 2015/0217790 A1 * | 8/2015 | Golden ............... B61L 15/0072 701/19 |
| 2016/0207550 A1 * | 7/2016 | Raeder ................. G07C 5/0816 |

FOREIGN PATENT DOCUMENTS

| GB | 2510561 | 8/2014 |
| WO | WO 2012/025406 A1 | 3/2012 |
| WO | WO 2012/038271 A1 | 3/2012 |

* cited by examiner

*Primary Examiner* — Lail A Kleinman
*Assistant Examiner* — Mahmoud M Kazimi
(74) *Attorney, Agent, or Firm* — Finnegan, Henderson, Farabow, Garrett & Dunner, LLP

(57) ABSTRACT

A visual diagnostic system for a railroad network is disclosed. The visual diagnostic system may have a sensor associated with a train asset in the railroad network and configured to generate a signal indicative of an operational status of the train asset, and a user interface associated with the train asset. The visual diagnostic system may also have a controller in communication with the sensor and the user interface. The controller may be configured to display on the user interface a graphical representation of the train asset in response to the signal.

13 Claims, 5 Drawing Sheets

VISUAL DIAGNOSTIC SYSTEM FOR RAILROAD NETWORK

TECHNICAL FIELD

The present disclosure relates to a visual diagnostic system, and more particularly, to a visual diagnostic system for a railroad network.

BACKGROUND

A railroad network includes a network of trains operated by one or more control stations. During operation, the network of trains transmits data to the control station(s), where one or more operators and/or processors analyze the data and provide instructions to each of the trains. The network often involves multiple trains each having multiple assets.

The assets associated with each train can include, among other things, locomotives, other non-locomotive rail vehicles, and/or stationary equipment located throughout the railroad network. Each asset has multiple components that are susceptible to wear and breakdown resulting from everyday use. As a result, each asset is typically provided with sensors and/or controllers for detecting abnormal operating conditions and sending signals to the control station(s) indicative of those conditions. However, although alerted to these abnormal conditions, the operators are generally provided with large amounts of data, making it difficult to collect and interpret the data in an efficient manner. Thus, the complexity of the network requires multiple levels of control working concertedly to ensure efficiency as well as accuracy.

One system that attempts to manage a fleet of remote assets is described in U.S. Pat. No. 7,783,507 (the '507 patent) that issued to Schick et al., on Aug. 24, 2010. The '507 patent discloses a system for managing a plurality of mobile assets, such as a fleet of locomotives. The system includes real-time data collection from each of the mobile assets, computerized analysis of the real-time data for failure detection and prediction, and the planning of maintenance activities responsive to such failure predictions prior to the mobile asset being taken out of service. The system also includes development of historical information regarding actual usage of each remote asset, and the arranging of that actual usage of the remote asset based on a plurality of operational modes of the asset. The information is gathered and displayed on an Internet web site for future analysis by the user.

Although the system of the '507 patent may help the user to manage a fleet of locomotives, it may be limited. Specifically, while the system of the '507 patent may collect large amounts of data about the fleet of locomotives, the data is not organized in a manner that facilitates the user's analysis of potential issues with the fleet of locomotives. As a result, resolving the potential issues can be very time consuming, or even worse, the potential issues can be overlooked, causing even greater delays and expensive downtime of the locomotives.

The disclosed visual diagnostic system is directed to overcoming one or more of the problems set forth above.

SUMMARY OF THE INVENTION

One aspect of the disclosure is directed to a visual diagnostic system for a railroad network. The visual diagnostic system may include a sensor associated with a train asset in the railroad network and configured to generate a signal indicative of an operational status of the train asset, and a user interface associated with the train asset. The visual diagnostic system may also include a controller in communication with the sensor and the user interface. The controller may be configured to display on the user interface a graphical representation of the train asset in response to the signal.

Another aspect of the disclosure is directed to a method of visually identifying a fault condition associated with a train asset in a railroad network. The method may include detecting the fault condition via a sensor located on the train asset. The method may also include displaying a graphical representation of the train asset in response to the detected fault condition.

Yet another aspect of the disclosure is directed to a railroad network. The railroad network may include a network of trains. Each train may include a plurality of assets. The railroad network may also include a sensor associated with one asset of the plurality of assets and configured to generate a signal indicative of a fault condition of the asset, and a user interface associated with the asset. The railroad network may further include a controller in communication with the sensor and the user interface, wherein the controller is configured to display on the user interface a graphical representation of the asset in response to the signal.

DETAILED DESCRIPTION

Figure 1:
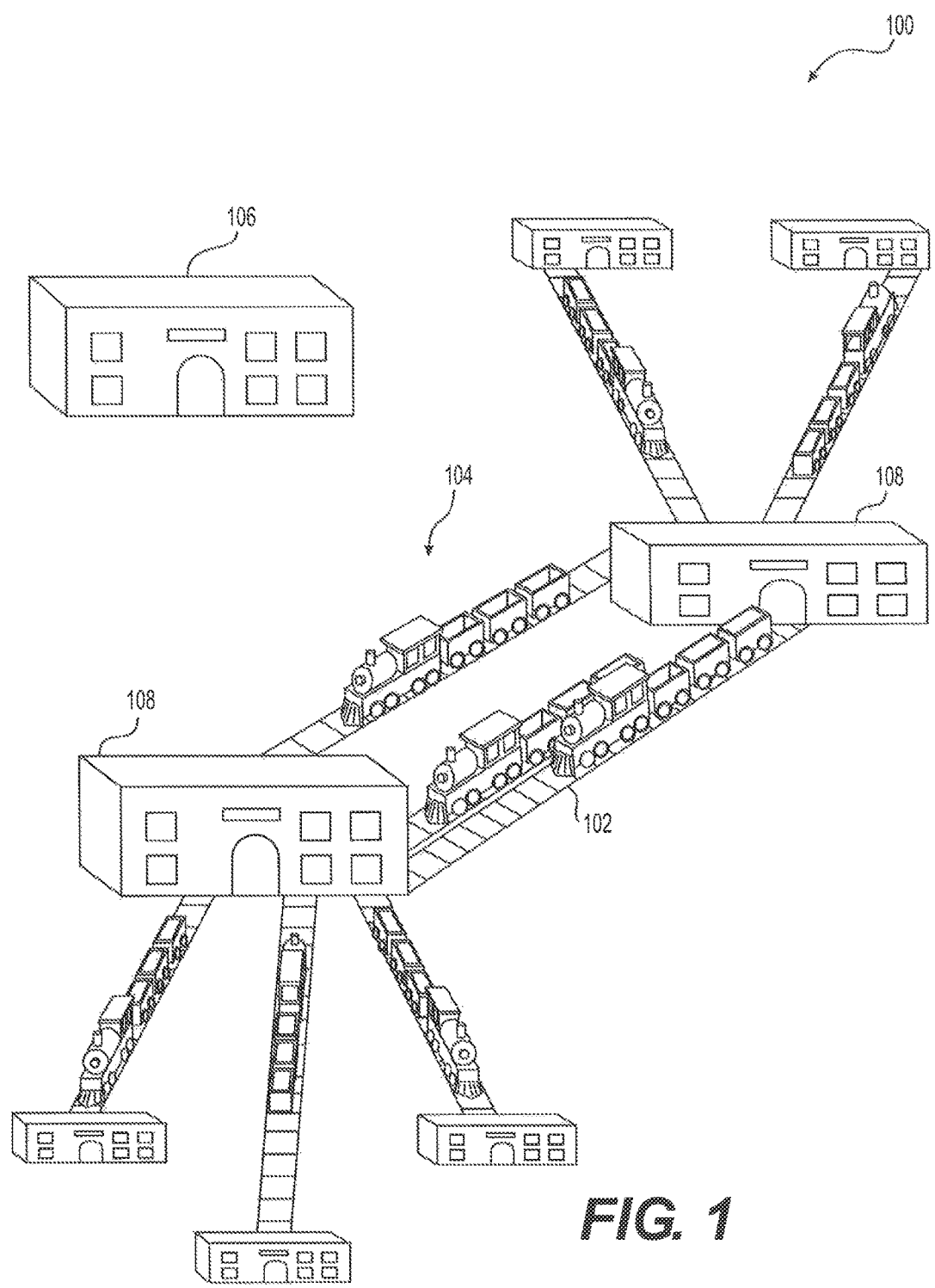
FIG. 1 is a schematic illustration of a railroad network.

FIG. 1 schematically illustrates an exemplary railroad network 100 consistent with certain disclosed embodiments. Railroad network 100 may include any number of tracks 102 that support various trains 104. Tracks 102 may be any type of transportation pathway, such as railroad tracks, subway rails, trolley tracks, etc., on which trains 104 may travel. Tracks 102 may be interconnected or separated, such that some trains 104 travel only on some tracks 102 and other trains 104 travel only on other tracks 102.

A control station 106 may be located near or away from tracks 102 and used by operators and/or electronic controllers to oversee movement of trains 104 throughout railroad network 100. Control station 106 may have components located onboard and off-board trains 104. Although only one control station 106 is illustrated in FIG. 1, it is contemplated that railroad network 100 may include any number of control stations 106, as desired. In some embodiments, control station 106 may control wayside equipment 108 to facilitate passage of trains 104 through railroad network 100. Wayside equipment 108 may include various control devices, such as axle hot box detectors, wheel load detectors, track switches, speed restriction signs, signal lights, gates, or other signal devices configured to manage rail vehicle traffic in railroad network 100.

Figure 2:
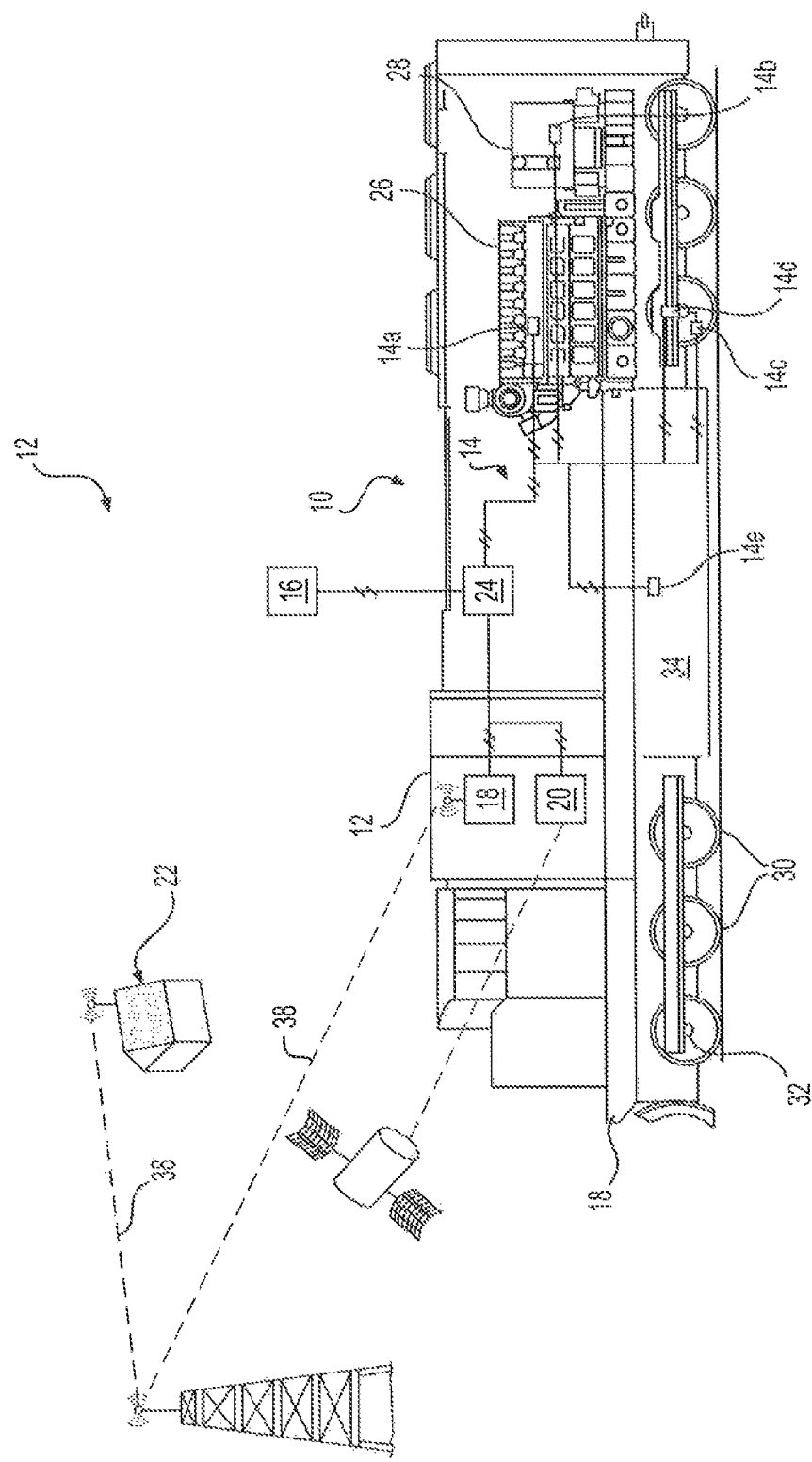
FIG. 2 is a schematic illustration of an exemplary disclosed train asset and visual diagnostic system that may be used in conjunction with the railroad network of FIG. 1.

Each train 104 may have a plurality of assets that includes any number of locomotives, non-locomotive rail vehicles, or other stationary equipment associated with train 104 (e.g., wayside equipment 108). For example, FIG. 2 illustrates one exemplary train asset 10. As shown in FIG. 2, asset 10 may embody an electrically-powered locomotive configured to provide power for its respective train 104. However, asset 10 may alternatively embody a passenger car, a cargo container car, or another type of car capable of traveling on tracks 102. Further, in some embodiments, asset 10 may alternatively embody wayside equipment 108 or other stationary equipment associated with train 104.

Also shown in FIG. 2 is a visual diagnostic system 12 associated with railroad network 100. System 12 may include one or more components that cooperate to gather and communicate information relating to the operation of each asset 10 associated with train 104. For example, system 12 may include an interface module 14, a user interface 16, a communication module 18, a locating device 20, and a controller 24 configured to communicate with an off-board control system 22. It is contemplated that one or more of interface module 14, communication module 18, locating device 20, and controller 24 may be integrated as a single unit, if desired. It is further contemplated that system 12 may include additional or different components than those illustrated in FIG. 2. System 12 may also include one or more components that cooperate to gather and communicate information relating to the operation of additional train assets (not shown) associated with each train 104.

Interface module 14 may include a plurality of sensors 14a-e distributed throughout asset 10 and configured to gather data from various components, subsystems, and/or operators of asset 10. Sensors 14a-e may be associated with, for example, an engine 26, a generator 28, wheels 30, traction motors 32, a fuel supply 34, user interface 16, and/or other components and subsystems of asset 10. Sensors 14a-e may monitor pressures, temperatures, volumes, voltages, currents, forces, speeds, and/or other parameters, and generate signals indicative of values of the parameters. Additionally, these signals may also indicate an operational status of sensors 14a-e themselves and/or the components and/or subsystems they monitor. In one aspect, the integrity, strength, and/or nature of the signals received from sensors 14a-e may indicate whether the respective components and/or subsystems are functioning properly. For example, different signal intensity thresholds may indicate a good condition, a moderate condition, a poor condition, a failed condition, etc. These signals may be communicated to controller 24 for subsequent processing and/or analysis.

User interface 16 may include a monitor, a touch-screen, a portable hand-held device (e.g., a cellular telephone, a personal digital assistant, etc.), a keypad, a control panel, a keyboard, and/or another input device. User interface 16 may receive input from a user, such as, for example, a train operator, and generate corresponding command signals in response to the input. These command signals may be communicated to controller 24 for processing. User interface 16 may also display information to the user in response to signals from controller 24 and/or off-board system 22.

Communication module 18 may include any device configured to facilitate communications between controller 24 and off-board system 22. Communication module 18 may include hardware and/or software that enables communication module 18 to send and/or receive data messages through a wireless communication link 38. The wireless communications may include satellite, cellular, infrared, and any other type of wireless communications that enables controller 24 to wirelessly exchange information with off-board system 22.

Locating device 20 may be configured to determine and communicate a location of asset 10 to controller 24 and/or oft-hoard system 22. For example, locating device 20 may include a Global Positioning System (GPS) receiver configured to receive position signals from one or more GPS satellites, an Inertial Reference Unit (IRU), or any other locating device known in the art.

Off-board system 22 may represent one or more computing systems associated with control station 106 that generate, maintain, send, and/or receive information associated with the operation of each asset 10 in railroad network 100. The one or more computing systems may include, for example, a laptop computer, a work station, a personal digital assistant, a mainframe, and other computing systems known in the art.

Figure 3:
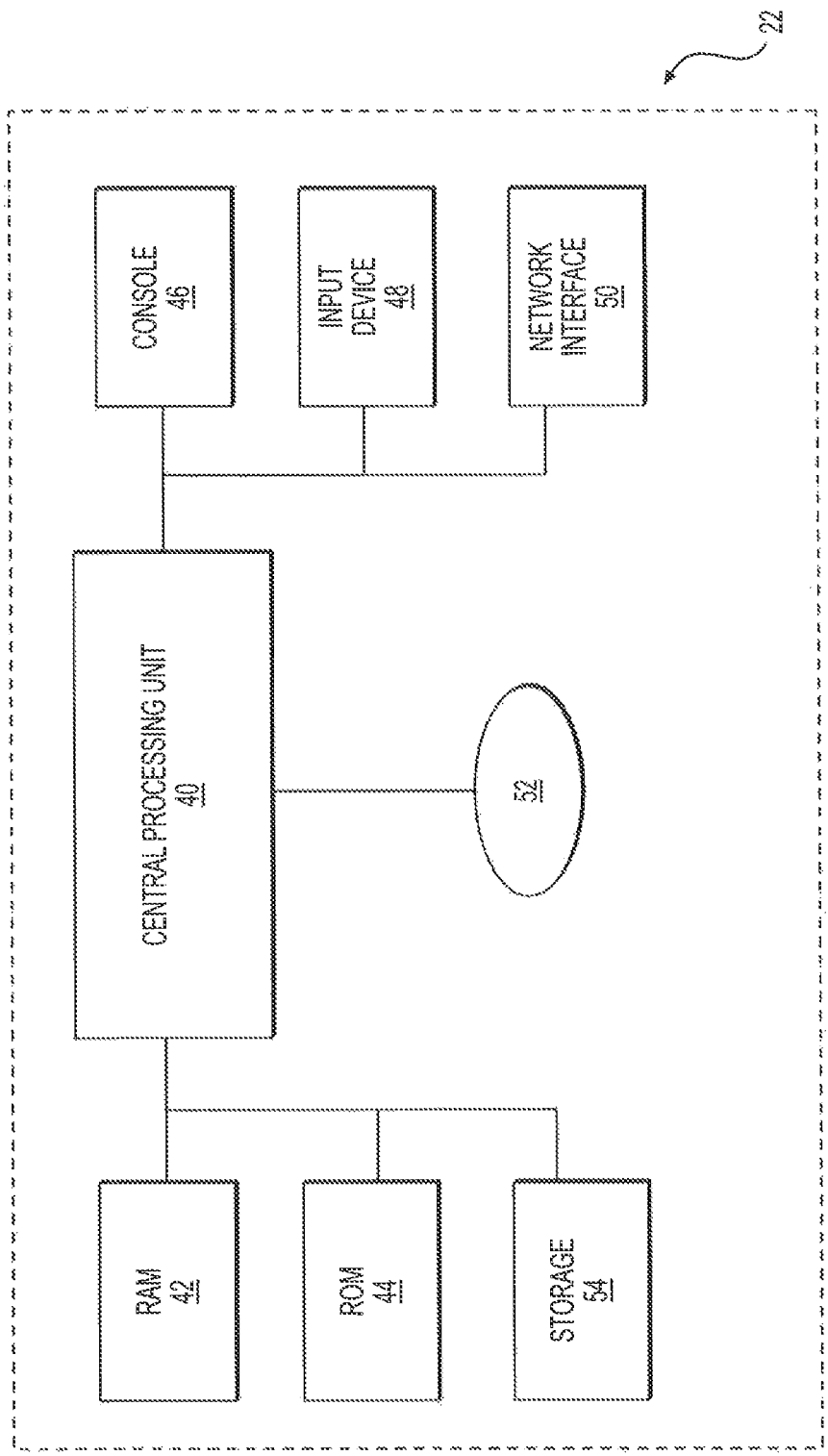
FIG. 3 is a diagrammatic illustration of an off-board control system that may be used in conjunction with the railroad network of FIG. 1.

As shown in FIG. 3, off-board system 22 may include a central processing unit (CPU) 40, a random access memory (RAM) 42, a read-only memory (ROM) 44, a console 46, an input device 48, a network interface 50, a database 52, and storage 54. It is contemplated that off-board system 22 may include additional, fewer, and/or different components than those listed above. It is to be understood that the type and number of listed devices are exemplary only and not intended to be limiting.

CPU 40 may embody, for example, one or more specially-constructed or generic microprocessors configured to execute sequences of computer program instructions to perform various processes in connection with the visual diagnostic system disclosed herein. The computer program instructions may be loaded into RAM 42 for execution by CPU 40 from ROM 44. During operation, CPU 40 and/or controller 24 via communication module 18 may carry out various processes in connection with the visual diagnostic system disclosed herein.

Storage 54 may embody any appropriate type of mass storage provided to store information CPU 40 and/or controller 24 may need to perform the processes. For example, storage 54 may include one or More hard disk devices, optical disk devices, removable memory devices, or other storage devices that provide appropriate storage space.

Off-board system 22 may interface with a user via console 46, input device 48, and network interface 50. In particular, console 46 may display information to users of off-board system 22. Console 46 may be any appropriate type of computer display device or computer monitor. Input device 48 may be provided for users to input information into off-board system 22. Input device 48 may include, for example, a keyboard, a mouse, and/or other wired or wireless computer input devices known in the art.

Network interface 50 may facilitate wireless and/or wired communications such that off hoard system 22 may be remotely accessed by controller 24 and/or other off-board systems (not shown). Network interface 50 may include and/or be associated with any suitable wired and/or wireless network architecture, such as, for example, a cellular telephone-based network (such as a PBX or POTS), a satellite-based network, a local area network (LAN), a wide area network (WAN), a controller area network (CAN), a dedicated intranet, the Internet, and/or any other suitable network architecture known in the art.

Database 52 may contain, among other things, information relating to each train, information relating to each asset, and/or information relating to diagnosing conditions with each asset. For example, the train information may include an up-to-date list of every train 104 operating in railroad network 100 and known data associated with each train 104. The asset information may include an up-to-date list of every asset 10 associated with each train 104 and known data associated with each asset 10. For example, the asset information may contain the latest information for each asset 10, such as, for example, a name, a serial number, a version number, and/or a date of manufacture for the asset. The train information and asset information may be kept current by, for example, automatic or manual electronic updates and/or by an authorized user of off-board system 22.

The diagnostic information contained in database 52 may include data that can be used to identify one or more fault conditions of each asset 10. For example, the diagnostic information may include tables of fault codes for each asset type (i.e., manufacturer, model number, etc.) indexed according to asset serial number. The tables may include entries indicating at least one failed component for each fault code. That is, for a particular asset type, each fault code may be linked or indexed to one or more failed components. The links between fault codes and failed component(s) may be established by authorized expert users of off-board system 22. Based on maintenance and repair data (e.g., statistical data), a given fault code may be known to indicate with substantial certainty the failure of a particular component or components. Each fault code may be further associated with information (e.g., name, part number, manufacturer, etc.) about accessories related to the one or more failed components associated with the fault code. The expert users of off-board system 22 may keep the diagnostic information up-to-date via console 46 based on forthcoming maintenance and repair data provided by a variety of sources.

Alternatively or additionally, at least some of the information described as contained in database 52 may be stored on controller 24, if desired. It should also be noted that a different number and/or different types of databases may be included within off-board system 22 and utilized by CPU 40, if desired. It is further contemplated that the information described above as being stored in database 52 may additionally or alternatively be stored within the memory of CPU 40 or elsewhere on off-board system 22, if desired.

Controller 24 may embody, for example, an electronic control module (ECM), or another processor capable of executing, and/or or outputting command signals in response to received and/or stored data to affect, among other things, the data acquisition discussed herein. Controller 24 may include means for accessing, reading, and processing the information described above to display visual diagnostic information of railroad network 100 by way of user interface 16. These means may include components such as, for example, a memory, one or more data storage devices, a central processing unit, or any other components that may be used to run an application.

Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Controller 24 may also include power supply circuitry, signal-conditioning circuitry, solenoid driver circuitry, communication circuitry, and other appropriate circuitry.

Controller 24 may be in communication with interface module 14, with communication module 18, with locating device 20, and with user interface 16 via communication lines. These communications may be facilitated by any suitable combination of wired and/or wireless hardware and carried out using known proprietary and/or non-proprietary links and protocols.

During operation of asset 10, controller 24 may continually receive the signals from sensors 14*a-e*. Controller 24 may then analyze the signals to determine an operational status of the sensors 14*a-e* and/or the components or subsystems they monitor. For example, controller 24 may compare the integrity of the signals to the integrity thresholds contained in the fault code table(s). If controller 24 retrieves a fault code from the table(s), which, as mentioned above, may mean that at least one component has failed, controller 24 may retrieve the diagnostic information stored in database 52 about the failed component. Controller 24 may then display this information on user interface 16 via a graphical user interface (GUI) 60, as shown in FIGS. 4 and 5.

Figure 4:
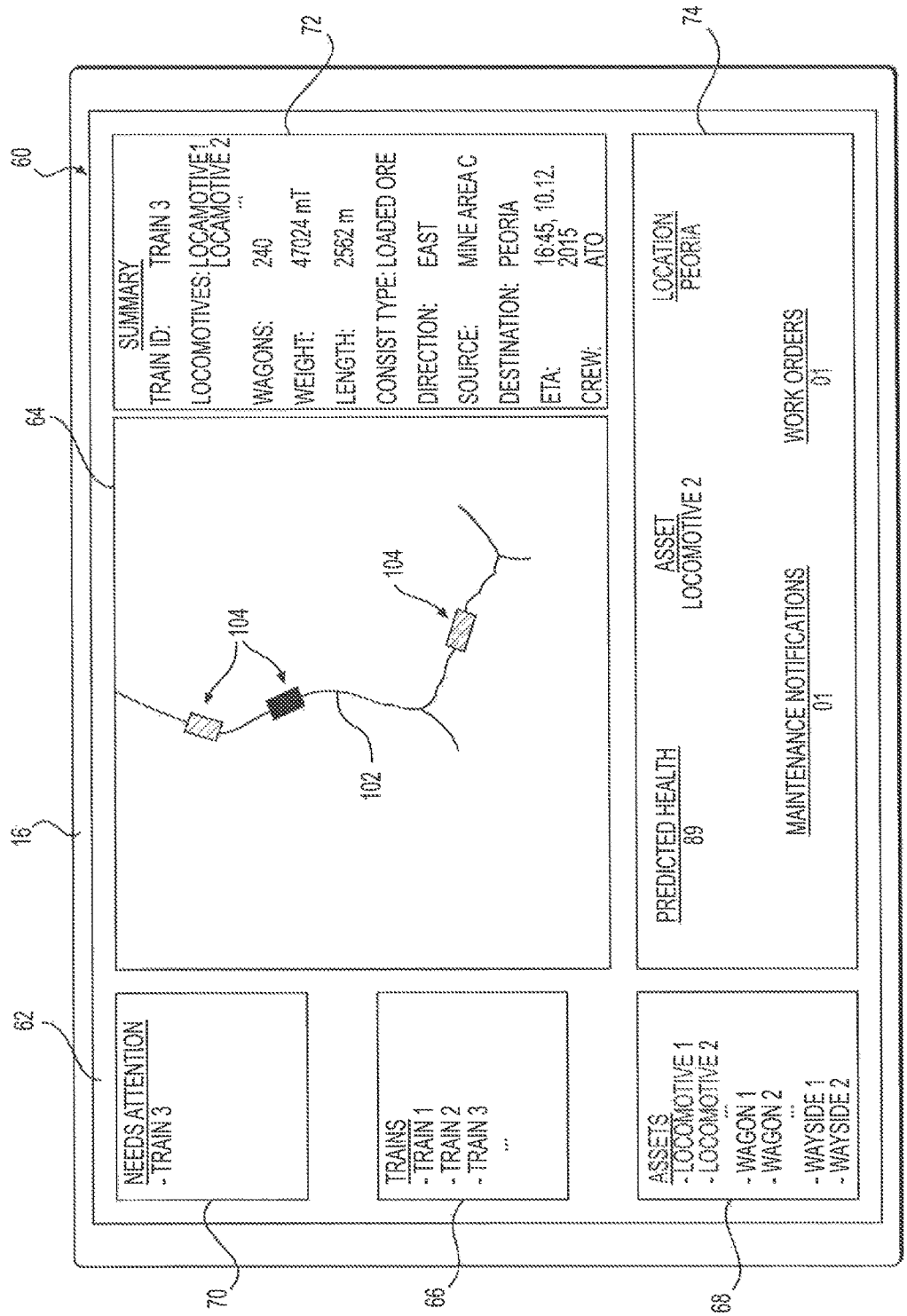
FIGS. 4 and 5 are graphical representations of an exemplary disclosed graphical user interface (GUI) that may be used in conjunction with the off-board control system of FIG. 3.
Figure 5:
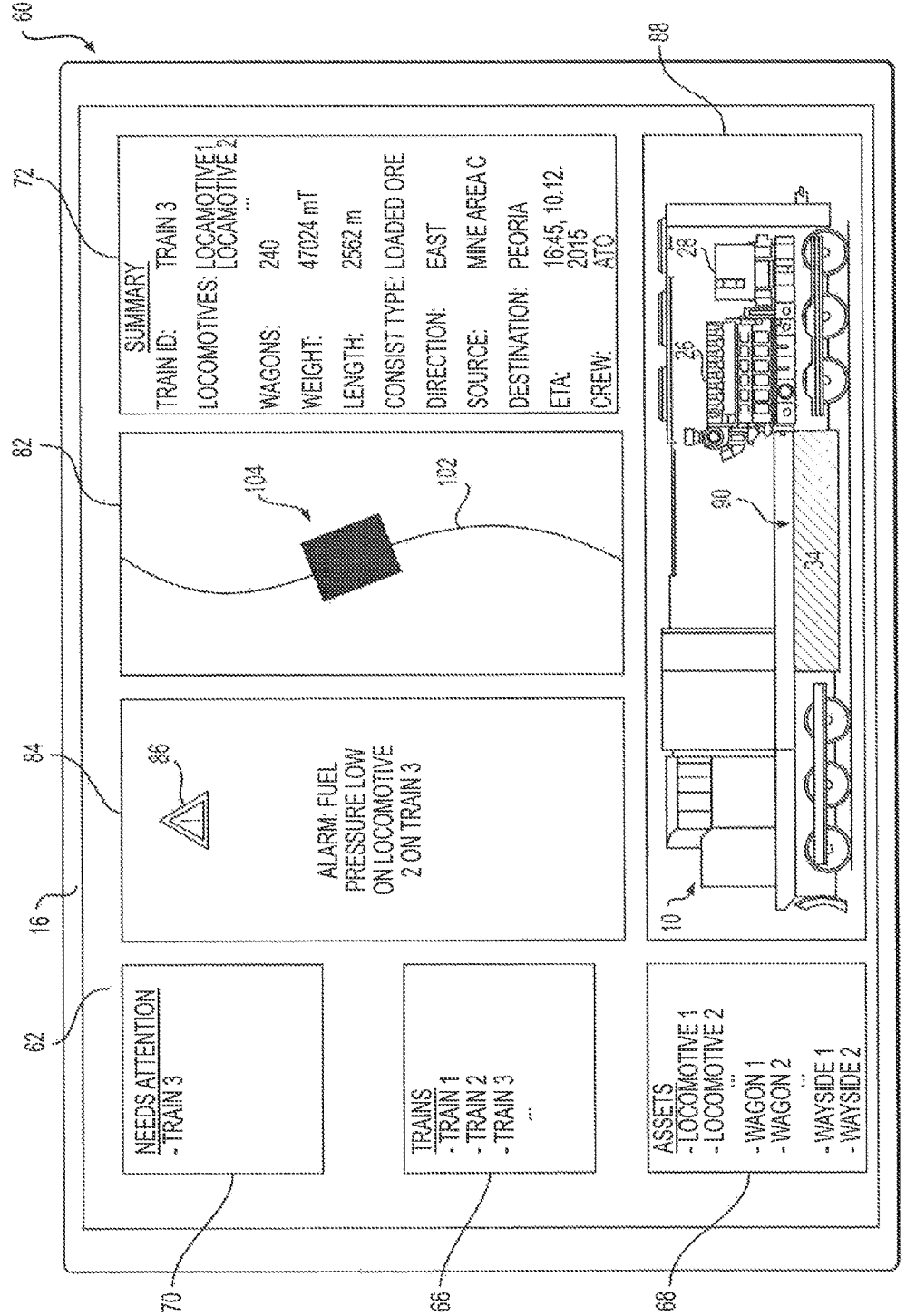

Referring to FIG. 4, GUI 60 may be a software tool including menus (e.g., drop-down menus), modules, buttons, toolbars, and other means to facilitate the conveyance and transfer of information to/from a user and off-board system 22 and/or controller 24. It is to be appreciated that GUI 60 may require user authentication, such as, for example, a username, a password, a pin number, an electromagnetic passkey, etc.

GUI 60 may include a display area 62 showing data and/or representations of railroad network 100. For example, display area 62 may show data and/or representations of one or more selected trains 104 and/or assets 10 associated with each train 104. Display area 62 may further show diagnostic information relating to the selected trains 104 and/or assets 10.

As shown in FIG. 4, display area 62 may include an electronic map 64 of railroad network 100. Electronic map 64 may be, for example, a two-dimensional or a three-dimensional graphical representation of railroad network 100, with locations of tracks 102 and trains 104 marked on the representation. Controller 24 may be configured to automatically generate and/or update the representation of railroad network 100, including the locations of trains 104, in real time during operation of trains 104. Controller 24 may also be configured to allow the operator of railroad network 100 to directly modify electronic map 64 and/or to select display parameters from available parameters stored in RAM 42 and/or ROM 44. It is contemplated that the modifications and/or display parameters may additionally or alternatively be automatically implemented and/or selectable based on modes of railroad operation, if desired.

In some aspects, electronic map 64 may visually indicate an operational status of each train 104 in railroad network 100. As illustrated in FIG. 4, each train 104 may be displayed with a different visual indicator on electronic map 64 depending on its operational status. For example, in the depicted embodiment, one train 104 experiencing at least one fault condition may be displayed with a solid shading, while other trains 104 experiencing normal conditions may be shown with a cross-hatch shading. FIG. 4 is only one exemplary method of visually indicating the operational status of each train 104 in railroad network 100. In some aspects, electronic map 64 may alternatively associate a different color with each train 104 depending on its operational status. For example, if train 104 is experiencing at least one fault condition, train 104 may be shown in red. Or, if train 104 has a risk of experiencing at least one fault condition but is not currently experiencing at least one fault condition, train 104 may be shown in yellow. Further, if train 104 is experiencing normal conditions, train 104 may be shown in blue. It is contemplated that, electronic map 64 may alternatively associate other known visual indicators with trains 104 to help the operator to identify the operational status of each train 104 on electronic map 64.

Display area 62 may also include one or more selectable lists to allow the user to selectively display certain information on electronic map 64. For example, display area 62 may include a selectable trains list 66 and a selectable assets list 68. Trains list 66 and assets list 68 may be selectable by the user to display or hide particular trains 104 or assets 10 on electronic map 64. In some aspects, an attention list 70 may also be provided in display area 62 to show which of the selected trains 104 and/or assets 10 require the user's attention.

Trains list 66 may show every train 104 associated with railroad network 100. The user may select one or more trains 104 in trains list 66. By selecting a particular train 104 in trains list 66, the selected train 104 may either be displayed or hidden from electronic map 64. Thus, the user may filter which trains 104 are shown on electronic map 64.

Assets list 68 may show each asset 10 associated with a particular train 104. For example, assets list 68 may include any number of locomotives, wagons, and/or wayside equipment that are associated with a particular train 104. By selecting a particular asset 10 in assets list 68, the selected asset 10 may either be displayed or hidden from electronic map 64. Thus, the user may filter which assets 10 are shown on electronic map 64.

Attention list 70 may show any trains 104 and/or assets 10 that require the user's attention. For example, attention list 70 may display any trains 104 and/or assets 10 that are currently experiencing at least one fault condition. In particular, by using the information compiled from sensors 14a-e, controller 24 may determine that a particular train 104 has one or more assets 10 that are currently experiencing at least one fault condition. Accordingly, these trains 104 and/or assets 10 may be displayed on attention list 70 to draw the user's attention to the trains 104 and/or assets 10 experiencing fault conditions. For example, as shown in FIG. 4, if controller 24 determines that "TRAIN 3" has one or more assets 10 experiencing at least one fault condition, "TRAIN 3" may be displayed in attention list 70. The user may then be able to select the respective trains 104 and/or assets 10 on attention list 70 to show more information about the particular trains 104 and/or assets 10 in other areas of display area 62.

In some aspects, by selecting a particular train 104 from trains list 66 or attention list 70, display area 62 may show data relating to the selected train 104 in train data region 72. For example, the user may select "TRAIN 3" in trains list 66 or attention list 70, and train data region 72 may display data relating to "TRAIN 3", In some embodiments, the data may be extracted from database 52. As shown in FIG. 4, the data may include, for example, a train identification ("Train ID"), a list of locomotives associated with the train, the number of wagons associated with the train, the overall weight of the train, the overall length of the train, the consist type associated with the train, the direction of the train, the source of the train, the destination of the train, the estimated time of arrival ("ETA") of the train, and/or a crew associated with the train. FIG. 4 illustrates an exemplary set of data displayed relating to "TRAIN 3" at one moment in time, however, it is contemplated that the information in train data region 72 may be updated in real-time, via controller 24. In addition, by selecting the particular train 104 from trains list 66 or attention list 70, display area 62 may show all of the assets 10 associated with the selected train 104 in assets list 68.

In some aspects, by selecting a particular asset 10 from assets list 68 or attention list 70, display area 62 may show data relating to the selected asset 10 in asset data region 74. For example, the user may select "LOCOMOTIVE 2" from assets list 68 or attention list 70, and asset data region 74 may show data relating to "LOCOMOTIVE 2". In some embodiments, the data may be extracted from database 52. As Shown in FIG. 4, the data may include, for example, the asset name, a health score associated with the asset, a location of the asset, the number of maintenance notifications associated with the asset, and/or the number of work orders associated with the asset. FIG. 4 illustrates an exemplary set of data relating to "LOCOMOTIVE 2" at one moment in time, however, it is contemplated that the data in assets data region 74 may be updated in real-time, via controller 24.

In some aspects, by clicking on a particular train 104 displayed on electronic map 64, display area 62 may show an electronic map 82 of train 104, as shown in FIG. 5. Electronic map 82 may be a two-dimensional or a three-dimensional graphical representation of train 104. Specifically, electronic map 82 may be a portion of electronic map 64 that is focused or zoomed in on the selected train 104. It is contemplated that, in some aspects, electronic map 82 may be focused on only a portion of railroad network 100.

In addition, by clicking on the particular train 104 displayed on electronic map 64, display area 62 may also show a warning region 84 displaying one or more fault conditions associated with the selected train 104. Warning region 84 may include one or more warning messages corresponding to the one or more fault conditions associated with assets 10 on the selected train 104. For example, as shown in FIG. 5, the warning message may read "ALARM: FUEL PRESSURE LOW ON LOCOMOTIVE 2 ON TRAIN 3", This message may alert the operator to the particular asset 10 on the selected train 104 that is experiencing the fault condition, in order to allow the operator to make appropriate decisions for maintenance and repair of that particular asset 10. Warning region 84 may also include one or more visual indicators 86 to alert the user of the fault condition. As illustrated in FIG. 5, visual indicator 86 may be in the form of a warning triangle. However, it is contemplated that other known visual indicators may alternatively be used to alert the user to the fault condition.

In some aspects, by clicking on a particular warning message and/or visual indicator 86 displayed in warning region 84, display area 62 may show a two-dimensional or a three-dimensional graphical representation 88 of the asset 10 experiencing the fault condition. For example, as shown in FIG. 5, graphical representation 88 may show the asset 10 and all of its associated components. In some aspects, graphical representation 88 may include a visual indicator 90 associated with one or more components on asset 10 that are experiencing the fault condition. For example, if the fuel pressure is low on the particular asset 10, as described above, a component associated with that warning may be visually indicated on graphical representation 88. As illustrated in FIG. 5, if the fuel pressure is low, fuel tank 34 of asset 10 may be highlighted to alert the operator to that particular component of asset 10. It is contemplated that other components associated the fault condition, such as a fuel pump, fuel injectors, and/or engine cylinders, may also be highlighted to alert the operator to those components as well.

One skilled in the art will realize that the processes illustrated in this description may be implemented in a variety of ways and include other modules, programs, applications, scripts, processes, threads, or code sections that may all functionally interrelate with each other to accomplish the individual tasks described above for each module, script, and daemon. For example, these programs modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose.

The described implementation may include a particular network configuration hut embodiments of the present disclosure may be implemented in a variety of data communication network environments environments using software, hardware, or a combination of hardware and software to provide the processing functions.

INDUSTRIAL APPLICABILITY

The disclosed visual diagnostic system may be applicable to any transportation network, including subways, trolleys, and railroads. The disclosed visual diagnostic system may increase efficiency in collecting, analyzing, and visually identifying operational statuses of a network of trains. In particular, the disclosed visual diagnostic system may allow a user to easily identify one or more trains having assets that are experiencing fault conditions. The disclosed visual diagnostic system may also display graphical representations of the trains and/or assets experiencing fault conditions to allow the user to respond to the fault conditions in an efficient manner. An exemplary operation of the disclosed visual diagnostic system will now be explained.

During operation of asset 10, controller 24 may receive signal(s) from sensors 14a-e indicative of an operational status of asset 10. For example, a signal provided by a pressure sensor 14e associated with fuel supply 34 may begin to deteriorate, lose integrity, or otherwise malfunction. In response to the signal from sensor 14e, controller 24 may identify and retrieve a fault code in the fault code table. Controller 24 may then access the diagnostic information in database 52, look up an entry for the identified fault code of the particular component, and retrieve any information associated with the entry.

Referring to FIGS. 4 and 5, controller 24 may then display this information in GUI 60 by way of user interface 16, as described above. Specifically, controller 24 may visually indicate on electronic map 64 an operational status of each train 104 in railroad network 100. As shown in FIG. 4, trains 104 that are experiencing at least one fault condition may be displayed with a different visual indicator than trains 104 that are experiencing normal conditions.

In some aspects, the user may filter the different trains 104 and assets 10 displayed on electronic map 64 via trains list 66 and assets list 68. For example, each of the plurality of user selectable entries in trains list 66 may correspond to a different train 104. Controller 24 may receive a selection of the different trains 104 from the user and display the selected trains 104 on electronic map 64. Likewise, each of the plurality of user-selectable entries in assets list 68 may correspond to a different asset 10. Controller 24 may receive a selection of the different assets 10 from the user and display the selected assets 10 on electronic map 64.

As each train 104 and/or asset 10 is selected by the user, controller 24 may also display data relating to the selected train 104 and/or the selected asset 10 in train data region 72 and asset data region 74, respectively. For example, the user may select "TRAIN 3" and "LOCOMOTIVE 2" from trains list 66 and assets list 68. The data relating to "TRAIN 3" and "LOCOMOTIVE 2" may then be displayed in train data region 72 and asset data region 74, respectively.

Controller 24 may also display attention list 70 to alert the user to trains 104 and/or assets 10 that are experiencing fault conditions. For example, if "TRAIN 3" has one or more assets 10 experiencing at least one fault condition, "TRAIN 3" may be displayed in attention list 70. In some aspects, the user may then select "TRAIN 3" from attention list 70 to display data relating to "TRAIN 3" in train data region 72.

In some aspects, the user may click on a particular train 104 in electronic map 64 to display electronic map 82, which shows a graphical representation of train 104. For example, if the user clicks on "TRAIN 3" in electronic map 64, then a zoomed-in view of "TRAIN 3" May be displayed in electronic map 82. Clicking on "TRAIN 3" in electronic map 64 may also cause warning region. 84 to be displayed next to electronic map 82. Warning region 84 may include warnings corresponding to the fault conditions associated with assets 10 of "TRAIN 3". For example, as shown in FIG. 5, warning region 84 may display a warning message "ALARM: FUEL PRESSURE LOW ON LOCOMOTIVE 2 ON TRAIN 3". In addition, warning region 84 may also display visual indicator 86 to alert the user to the warning message.

The user may then click on the warning message in warning region 84 to display a graphical representation 88 of asset 10. Graphical representation 88 may visually indicate one or more components of asset 10 experiencing fault conditions. For example, graphical representation 88 may include visual indicator 90, which highlights one or more components of assets 10. As shown in FIG. 5, fuel tank 34 may be highlighted by visual indicator 90 to focus the user's attention to that particular component of asset 10.

By using the disclosed visual diagnostic system, a user may be able to quickly identify fault conditions associated with each train and/or asset and provide a timely response to correct the fault conditions. Further, the user may be able to collect, interpret, and visually identify the trains and their respective assets in an organized manner, which can also aid in maintenance and repair of any failed components.

It will be apparent to those skilled in the art that various modifications and variations can be made to the visual diagnostic system of the present disclosure. Other embodiments of the method and system will be apparent to those skilled in the art from consideration of the specification and practice of the visual diagnostic system disclosed herein. It is intended that the specification and examples be considered as exemplary only, with a true scope of the disclosure being indicated by the following claims and their equivalents.

What is claimed is:

1. A visual diagnostic system for a railroad network, comprising:
 a sensor associated with a train asset in the railroad network and configured to generate a signal indicative of an operational status of the train asset, wherein the train asset is at least one of a locomotive, a non-locomotive rail vehicle, or stationary wayside equipment located in the railroad network;
 a user interface associated with the train asset; and
 a controller in communication with the sensor and the user interface, wherein the controller is configured to display on the user interface a graphical representation of the train asset in response to the signal, and display a warning on the user interface corresponding to a fault condition associated with a component on the train asset, wherein selection of the train asset on the user interface results in a display of data relating to the selected train asset, and selection of the warning results in a visual indicator highlighting the component on the graphical representation of the train asset.

2. The visual diagnostic system of claim 1, wherein the controller is further configured to:
   display on the user interface a plurality of user-selectable entries each corresponding to a different train in the railroad network;
   receive by way of the user interface a selection of the plurality of user-selectable entries; and
   display on the user interface an electronic map corresponding to the selection of the plurality of user-selectable entries.

3. The visual diagnostic system of claim 2, wherein the controller is further configured to display a first train on the electronic map having a different visual indicator than a second train displayed on the electronic map.

4. The visual diagnostic system of claim 2, wherein the controller is further configured to display data relating to at least one train corresponding to the selection of the plurality of user-selectable entries.

5. The visual diagnostic system of claim 1, wherein the controller is further configured to:
   display on the user interface a plurality of user-selectable entries each corresponding to a different train asset in the railroad network;
   receive by way of the user interface a selection of the plurality of user-selectable entries; and
   display on the user interface an electronic map corresponding to the selection of the plurality of user-selectable entries.

6. The visual diagnostic system of claim 4, wherein the controller is further configured to display data relating to at least one train asset corresponding to the selection of the plurality of user-selectable entries.

7. A method of visually identifying a fault condition associated with a train asset in a railroad network, the method comprising:
   detecting the fault condition via a sensor located on the train asset;
   displaying on a user interface a graphical representation of the train asset in response to the detected fault condition;
   displaying a warning on the user interface corresponding to the fault condition associated with a component on the train asset;
   selecting the train asset on the user interface;
   displaying data relating to the selected train asset;
   selecting the warning on the user interface; and
   generating a visual indicator highlighting the component on the graphical representation of the train asset in response to selecting the warning on the user interface.

8. The method of claim 7, further including:
   displaying a plurality of user-selectable entries each corresponding to a different train in the railroad network;
   receiving a selection of the plurality of user-selectable entries; and
   displaying an electronic map corresponding to the selection of the plurality of user-selectable entries.

9. The method of claim 8, further including displaying a first train on the electronic map having a different visual indicator than a second train displayed on the electronic map.

10. The method of claim 8, further including displaying data relating to at least one train corresponding to the selection of the plurality of user-selectable entries.

11. The method of claim 7, further including:
    displaying a plurality of user-selectable entries each corresponding to a different train asset in the railroad network;
    receiving a selection of the plurality of user-selectable entries; and
    displaying an electronic map corresponding to the selection of the plurality of user-selectable entries.

12. The method of claim 11, further including displaying data relating to at least one train asset corresponding to the selection of the plurality of user-selectable entries.

13. A railroad network, comprising:
    a network of trains, each train including a plurality of assets, wherein each asset is at least one of a locomotive, a non-locomotive rail vehicle, or stationary wayside equipment located in the railroad network;
    a sensor associated with one asset of the plurality of assets and configured to generate a signal indicative of a fault condition of the asset;
    a user interface associated with the asset; and
    a controller in communication with the sensor and the user interface, wherein the controller is configured to display on the user interface a graphical representation of the asset in response to the signal, and display a warning on the user interface corresponding to the fault condition associated with a component on the asset, wherein selection of the asset on the user interface results in a display of data relating to the selected asset, and selection of the warning results in a visual indicator highlighting the component on the graphical representation of the asset.

* * * * *